US006808191B1

(12) United States Patent
Buhl et al.

(10) Patent No.: US 6,808,191 B1
(45) Date of Patent: Oct. 26, 2004

(54) AXLE SUSPENSION FOR RIGID AXLES OF VEHICLES

(75) Inventors: Reinhard Buhl, Bohmte (DE); Holger Bublies, Osnabrück (DE)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 5 days.

(21) Appl. No.: 09/890,381

(22) PCT Filed: Nov. 28, 2000

(86) PCT No.: PCT/DE00/04217

§ 371 (c)(1),
(2), (4) Date: Aug. 28, 2001

(87) PCT Pub. No.: WO01/40001

PCT Pub. Date: Jun. 7, 2001

(30) Foreign Application Priority Data

Nov. 30, 1999 (DE) .......................................... 199 57 628

(51) Int. Cl.[7] ............................................. B60G 21/055
(52) U.S. Cl. ......................... 280/124.107; 280/124.116
(58) Field of Search ................... 280/124.107, 124.116, 280/124.164, 124.175, 124.128, 678; 180/349, 352, 378

(56) References Cited

U.S. PATENT DOCUMENTS

| 2,300,844 | A | * | 11/1942 | Olley ......................... 180/349 |
| 2,607,617 | A | | 8/1952 | Pringle |
| 3,162,465 | A | * | 12/1964 | Vaugoyeau .......... 280/124.101 |
| 3,406,983 | A | | 10/1968 | Masser |
| 3,871,677 | A | * | 3/1975 | Blank et al. ................ 280/680 |
| 4,007,924 | A | | 2/1977 | Jorne et al. |
| 4,034,996 | A | | 7/1977 | Manita et al. |
| 5,203,585 | A | | 4/1993 | Pierce |
| 5,228,718 | A | * | 7/1993 | Kooistra ..................... 280/678 |
| 5,746,441 | A | * | 5/1998 | VanDenberg ........ 280/124.116 |
| 6,129,367 | A | * | 10/2000 | Bublies et al. ........ 280/124.107 |
| 6,308,971 | B1 | * | 10/2001 | Mikaelsson et al. .. 280/124.107 |
| 6,460,872 | B2 | * | 10/2002 | Cadden ...................... 280/678 |

FOREIGN PATENT DOCUMENTS

| DE | 43 38 651 A1 | 3/1995 |
| DE | 44 07 740 A1 | 9/1995 |
| DE | 195 21 874 A1 | 12/1996 |
| EP | 0 914 976 A1 | 5/1999 |
| EP | 0 949 093 A2 | 10/1999 |
| WO | WO 95/28294 | 10/1995 |
| WO | WO 99/58354 | 11/1999 |

* cited by examiner

*Primary Examiner*—Faye Fleming
*Assistant Examiner*—Faye M. Fleming
(74) *Attorney, Agent, or Firm*—McGlew and Tuttle, P.C.

(57) ABSTRACT

An axle suspension for rigid axles of vehicles, especially air-suspension (e.g., with air shock absorbers/air springs) utility vehicles, is presented, in which a twistable four-point connecting rod (4), which is connected in an articulated manner to the vehicle axle (3), on the one hand, and to the vehicle body (1a, 1b), on the other hand, and which is connected to the vehicle axle (3) and to the vehicle body (1a, 1b) by four said joints (5, 6, 7, 8) each located at spaced locations from one another in the transverse direction of the vehicle. The four-point connecting rod is arranged above the vehicle axle (3). At least one axle strut (11, 12), which extends in the longitudinal direction of the vehicle and connects the vehicle axle (3) to the vehicle body (1a, 1b) in a vertically movable manner, is arranged on each side of the vehicle for guiding the axle. At least one air spring assembly unit (19, 20) is arranged between the vehicle axle (3) and the vehicle body (1a, 1b) for spring suspension. The axle struts 11, 12 are each connected to the vehicle axle (3) by a molecular joint (15, 16). The articulated mounting of the vehicle axle leads to a markedly more favorable elasticity for the entire system of the axle suspension and to an unambiguous assignment of the kinematic conditions under all driving conditions, so that an inward and outward deflection of the axle as well as the pendular behavior are not adversely affected by squeezing or jamming of the vehicle axle.

24 Claims, 7 Drawing Sheets

AXLE SUSPENSION FOR RIGID AXLES OF VEHICLES

FIELD OF THE INVENTION

The present invention pertains to an axle suspension for rigid axles of vehicles, especially air-suspension, air cushioned or air sprung utility vehicles, in which a twistable, angulatable or torsionable four-point connecting rod, which is connected in an articulated manner to the vehicle axle, on the one hand, and to the vehicle body, on the other hand, and which is connected by two joints located at spaced locations from one another in the transverse direction of the vehicle to the vehicle axle and to the vehicle body, is arranged above the vehicle axle, at least one axle strut, which extends in the longitudinal direction of the vehicle and connects the vehicle axle and the vehicle body in a vertically movable manner, is arranged on each side of the vehicle for axle guidance, and at least one spring assembly unit is arranged between the vehicle axle and the vehicle body for springing or suspension.

BACKGROUND OF THE INVENTION

Such axle suspensions of this type have been known from, e.g., DE 195 21 874. The design embodiment of such axle suspensions is, in principle, simple, space- and cost-saving, and has consistently proved successful in practice. However, such an axle suspension forming this type as well as other designs known from the prior art have the drawback that the axle is rigidly connected to the axle struts arranged adjacent to same. In conjunction with the entire axle construction, such a fastening leads to a kinematic overdetermination or redundancy, of the degrees of freedom of the vehicle chassis. This in turn leads to the course of the kinetic processes within the axle construction being undefined in certain situations, which may have an adverse effect on the coordination of the chassis and the chassis dynamics in the vertical and lateral directions.

Moreover, the kinematic overdetermination may lead to vibrations of the drive shaft with a resulting increase in the wear of the drive shaft and high load of the axle housing used in the case of driven axles.

SUMMARY AND OBJECTS OF THE INVENTION

The technical object of the present invention is to improve an axle suspension of this type such that the kinematic conditions are improved in order to optimize the dynamics of the vehicle movement and to achieve reduced vibrations and reduced wear as well as increased lateral rigidity of the axle construction. In addition, the number of the individual parts shall be further reduced, the ease of repair shall be increased and the unsprung or unsuspended weights shall be further reduced.

According to the present invention, the axle strut shall be connected to the vehicle axle by a molecular joint. Contrary to the axle constructions known from the prior art, the articulated mounting of the vehicle axle leads to a markedly more favorable elasticity for the entire system of the axle suspension and an unambiguous assignment or association of the kinematic conditions under all driving conditions, so that the inward and outward deflections of the axle as well as the pendular behavior are not adversely affected by squeezing, or jamming, or twisting of the vehicle axle.

It proved to be especially advantageous, in particular, that the axle struts have a mount or support for the spring assembly unit used and/or a shock absorber. The axle struts are extended for this purpose beyond the articulation point for the end connecting the axle strut to the vehicle axle at their free end not articulated to the vehicle body, and the spring assembly unit usually arranged separately between the vehicle axle and the vehicle body in prior-art constructions is accommodated at this end. The mount or support of the spring assembly unit may have a rigid or articulated design according to the present invention, and an articulated connection additionally reduces the wear of the spring assembly unit. This functional integration leads, furthermore, to a reduction in the number of components and thus to a reduction of the costs of the entire construction of the axle suspension even as a consequence of reduced assembly time and the stocking of a reduced number of parts. The spring assembly units can be optimally connected to the axle used due to the very simple axle design according to the present invention, and it is conceivable to arrange the axle struts in a V-shaped when viewed in three-dimensional space, which leads to an additional lateral stabilization. It is, of course, conceivable in this connection to provide the axle strut not only with a mount or support for one spring assembly unit, but, e.g., four or more spring assembly units, preferably air spring cushion elements in order to spring or cushion the vehicle axle.

To make it possible to adapt the kinematic conditions of the axle suspension to the design embodiment according to the present invention even better, it is, moreover, advantageous for the axle strut to be also fixed on the vehicle body by a molecular joint. This additional molecular joint should preferably have a stiffer joint characteristic than the vehicle axle-side molecular joint of the axle strut, because a cardanic angulation especially of air bellows used as spring elements is reduced hereby.

In addition, a clean design guiding of the parallelogram of both components is possible due to the spatial kinematics of the upper four-point connecting rod and of the lower axle strut with two joints, which in turn has a favorable effect on the overall kinematics of the axle and also offers the vehicle manufacturer ideal conditions for installation. In particular, the ideal trapezoid shape guiding guarantees that tie wear of the cardan universal-joint shaft is kept as low as possible.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
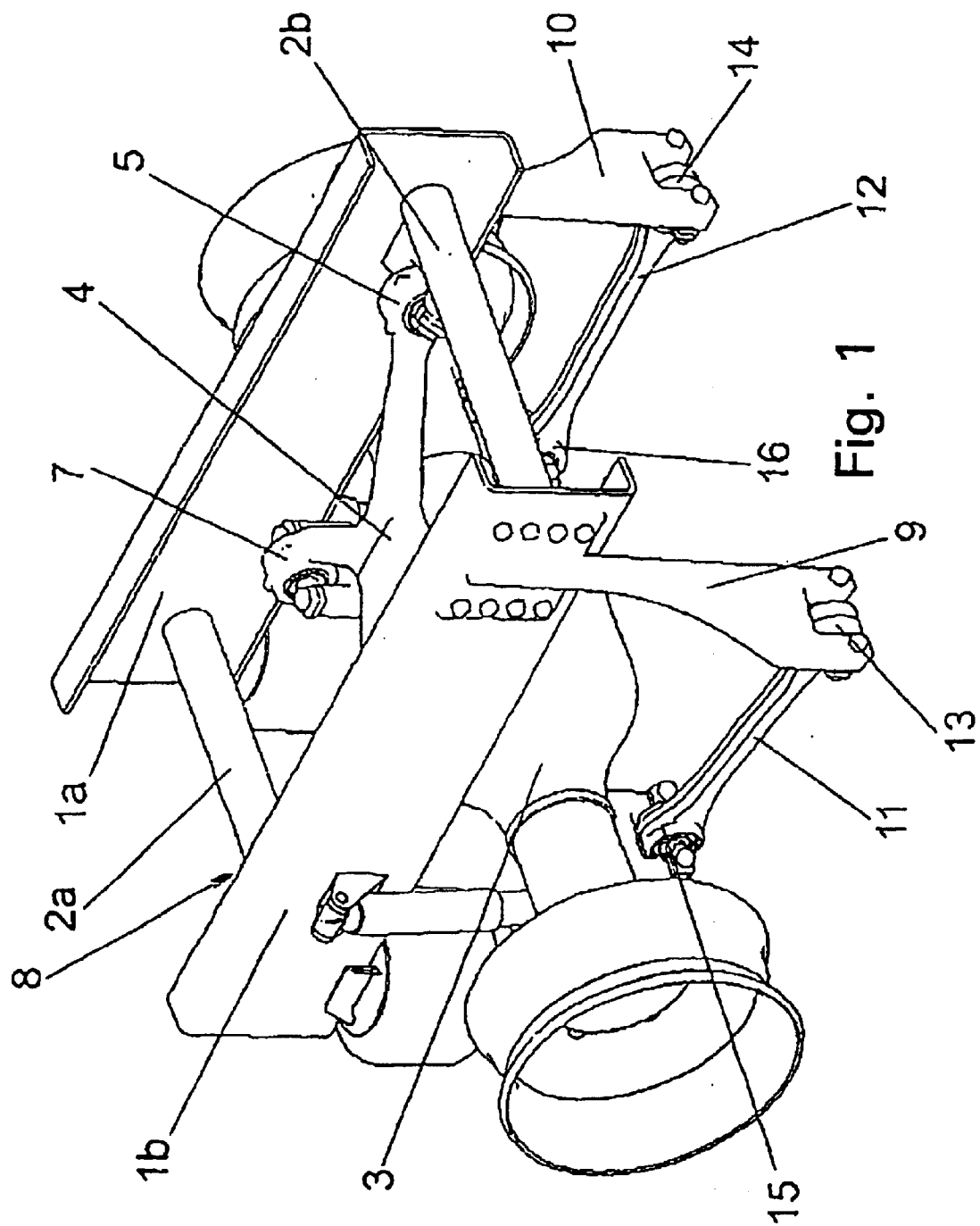
FIG. 1 is a perspective view of a first exemplary embodiment of the axle suspension according to the present invention when viewed obliquely in the front in the direction of the vehicle.

Referring to the drawings in particular, FIG. 1 shows the axle suspension according to the present invention on a utility vehicle chassis, not shown specifically here, which is provided with longitudinal beams 1a, 1b. The longitudinal beams 1a and 1b are arranged at laterally spaced locations from one another and are rigidly connected to one another by the crossbeams 2a, 2b. The vehicle axle 3, which is connected to the longitudinal beams 1a, 1b via a four-point connecting rod 4, is arranged under the longitudinal beams 1a and 1b. The four-point connecting rod 4 has, on the whole, four joints 5, 6, 7 and 8, and two joints 5, 6 each are fastened to the vehicle body and two joints 7, 8 to the vehicle axle. The joints fastened to the vehicle axle and to the body are arranged at spaced locations from one another in the transverse direction of the vehicle.

FIG. 1 also shows that a respective side brackets 9 and 10, at the lower, free end of which a respective axle strut 11 and 12 is articulated by means of a molecular joint 13 and 14 each, is fastened to each of the two longitudinal beams 1a and 1b.

Figure 4:
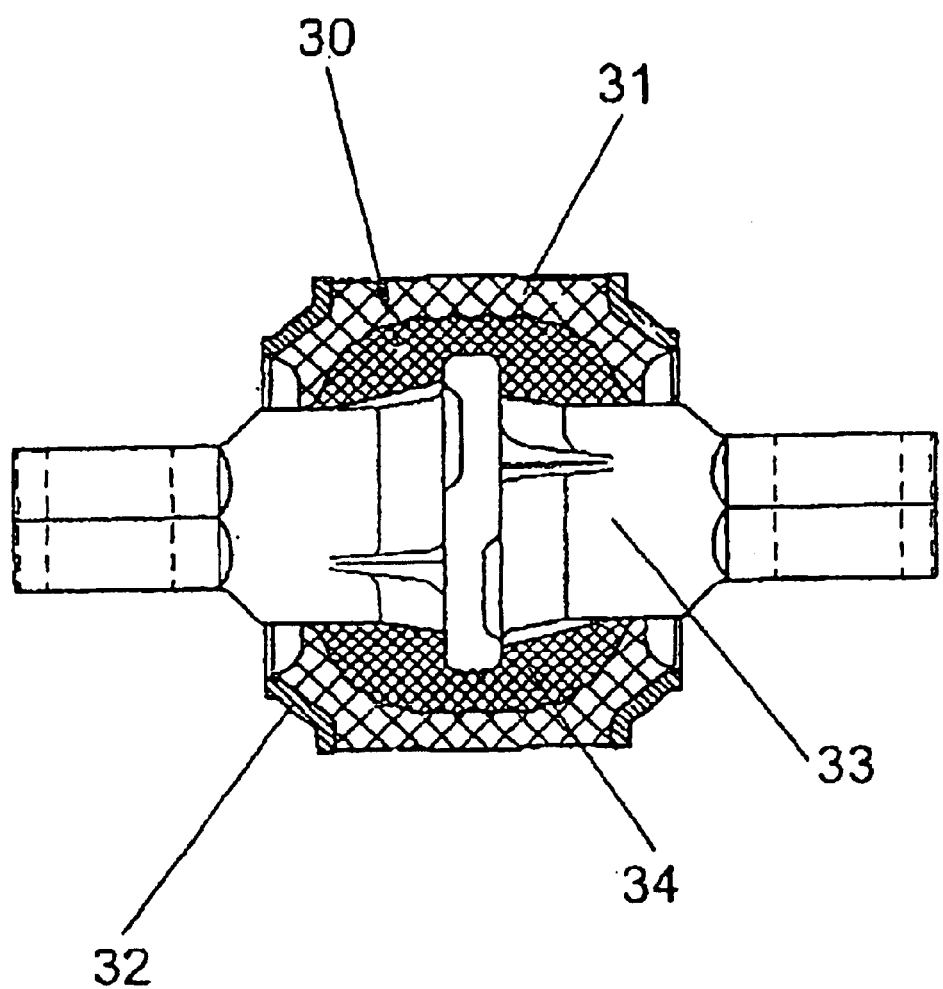
FIG. 4 is a sectional view of a molecular joint used for the axle suspension according to the present invention.

A molecular joint is, in principle, a joint as is shown as an example as a ball-and-socket joint in FIG. 4. The molecular joint comprises a joint ball 30 located on the inside, a housing 32 surrounding the joint ball, as well as an elastomer 31 arranged between the joint ball 30 and the housing 32. In the exemplary embodiment according to FIG. 4, the joint ball 30 has a two-part design, comprising an inner, metallic joint axle 33 and an outer ball 34 consisting of elastomer, which is made in one piece therewith. In another embodiment of the molecular joint, the joint ball 30 may be made of metal as a whole or it may have a cylindrical inner part instead of a ball. Such molecular joints can be correspondingly adapted to the loads acting on the joint by selecting the elastomer arranged between the joint ball 30 and the housing 32. Moreover, recesses, which bring about a specific effect on the joint characteristics, may be provided within the elastomer and/or the housing or on the inner part of the joint at least in some areas. Thus, molecular joints may have, e.g., a reduced damping in one direction and a correspondingly greater damping in at least one direction located offset in relation thereto.

The axle struts 11, 12 articulated to the side brackets 9, 10 by means of the molecular joints 13, 14 are arranged essentially in the horizontal direction and are connected to the axle 3 according to the present invention at their ends facing away from the molecular joints 13, 14 by means of another molecular joint 15, 16 each. The molecular joints 15, 16 have, in principle, the above-described design and make it possible both to absorb longitudinal and vertical forces and angulations, force acting at an angle or cardanics, which are introduced into the chassis by the movements of the axle. Overdetermination or redundancy of the kinematic degrees of freedom is prevented by the movements of the axle, so that a more optimal forward coordination can be brought about with respect to the chassis dynamics in the vertical and lateral directions.

Figure 2:
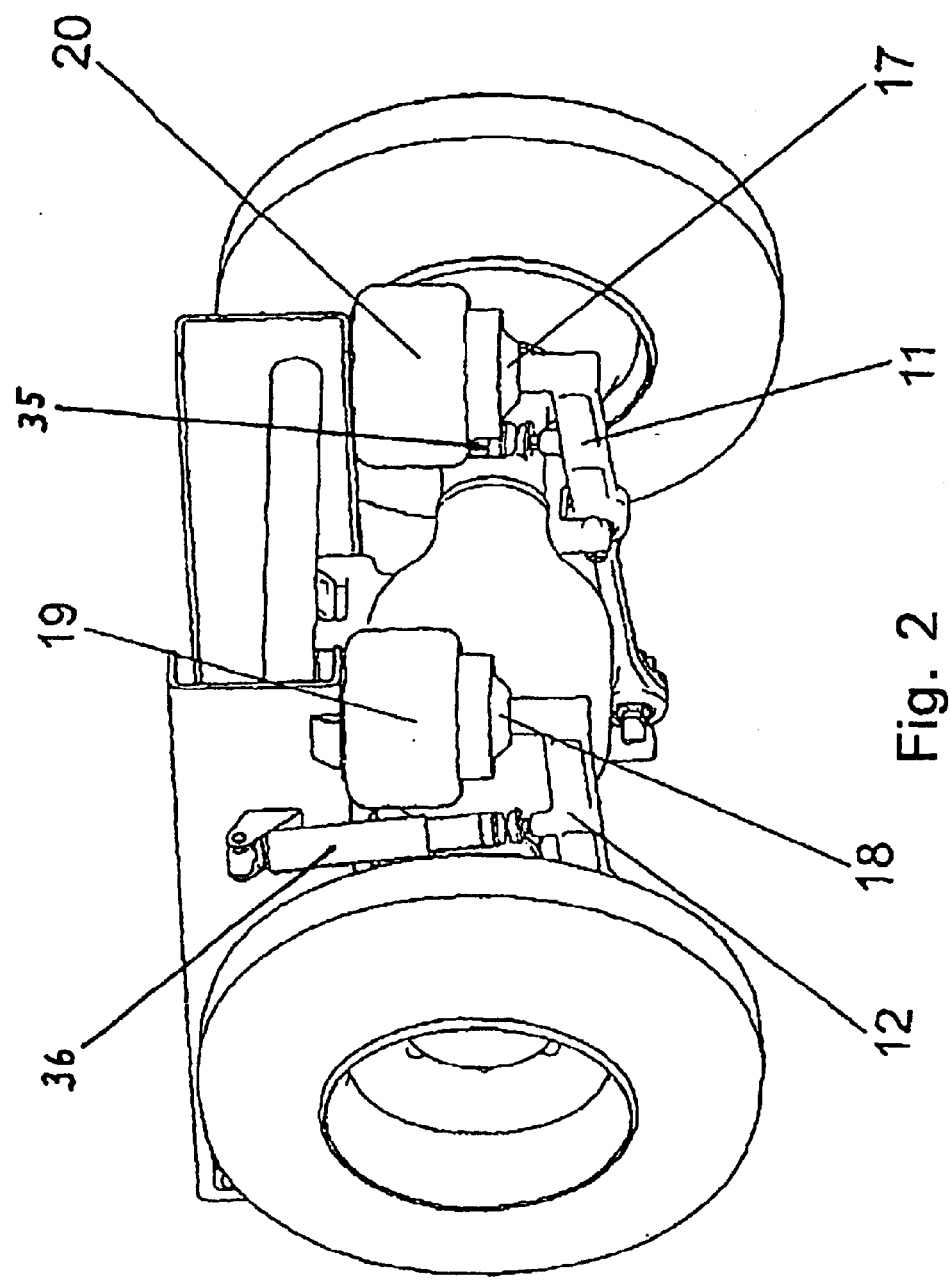
FIG. 2 is a perspective view of the axle suspension according to FIG. 1 when viewed obliquely at the rear.

The view in FIG. 2 shows that the axle struts 11, 12 are extended beyond the articulation point for the molecular joints 15 and 16 and have a mount 17 and 18 each for a respective spring assembly unit 19, 20 at their free ends. Furthermore, there is a connection between the axle struts 11, 12 and the vehicle body 1a, 1b via a shock absorber 35, 36 each. The extension of the axle struts 11 and 12 with the integration of the mounts 17 and 18 leads to a reduction in the number of components usually used in prior-art axle constructions and thus reduces the amount of parts to be stocked and the assembly times for the axle construction according to the present invention. The mounts 17 and 18 may be rigid, or formed by a ball-and-socket or other type of joint.

Figure 3:
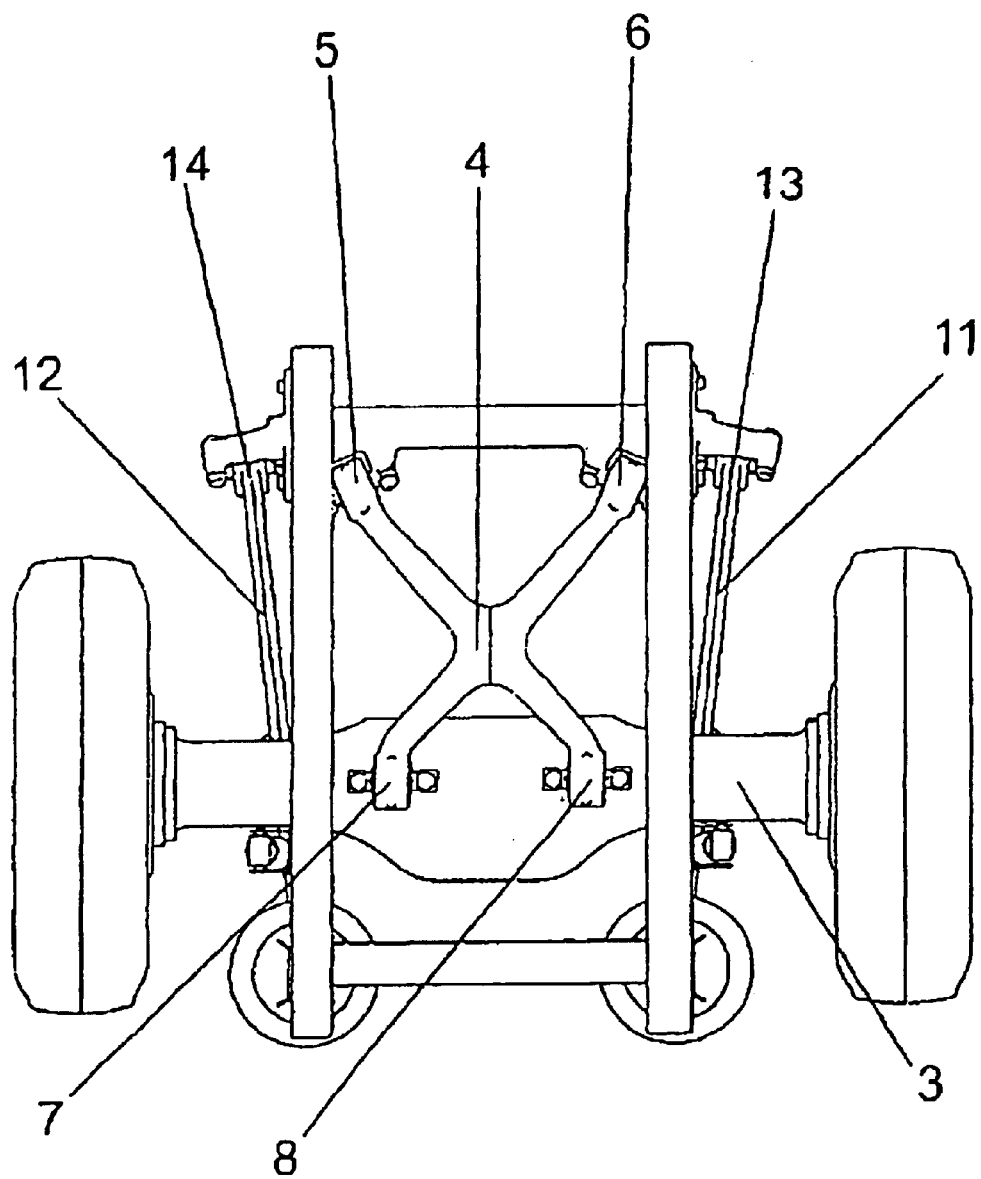
FIG. 3 is a top view of another exemplary embodiment of the axle suspension according to the present invention.

The top view of another exemplary embodiment of the axle construction according to the present invention in FIG. 3 shows that the axle struts 11 and 12 may have a direction extending toward the middle of the vehicle from their front articulation by means of the molecular joints 13 and 14 to the end of the vehicle when viewed in a top view. Moreover, the position of the four-point connecting rod 4 as well as of its articulation points on the body and the axle can be seen in the top view.

It is, of course, possible to also use the articulation according to the present invention of the axle to the axle struts for constructions in which three, four or more such spring elements are used instead of the two spring assembly units shown and in which the spring assembly units 19, 20 are arranged in front of or behind the vehicle axle 3 when viewed in the direction of the vehicle.

Figure 5:
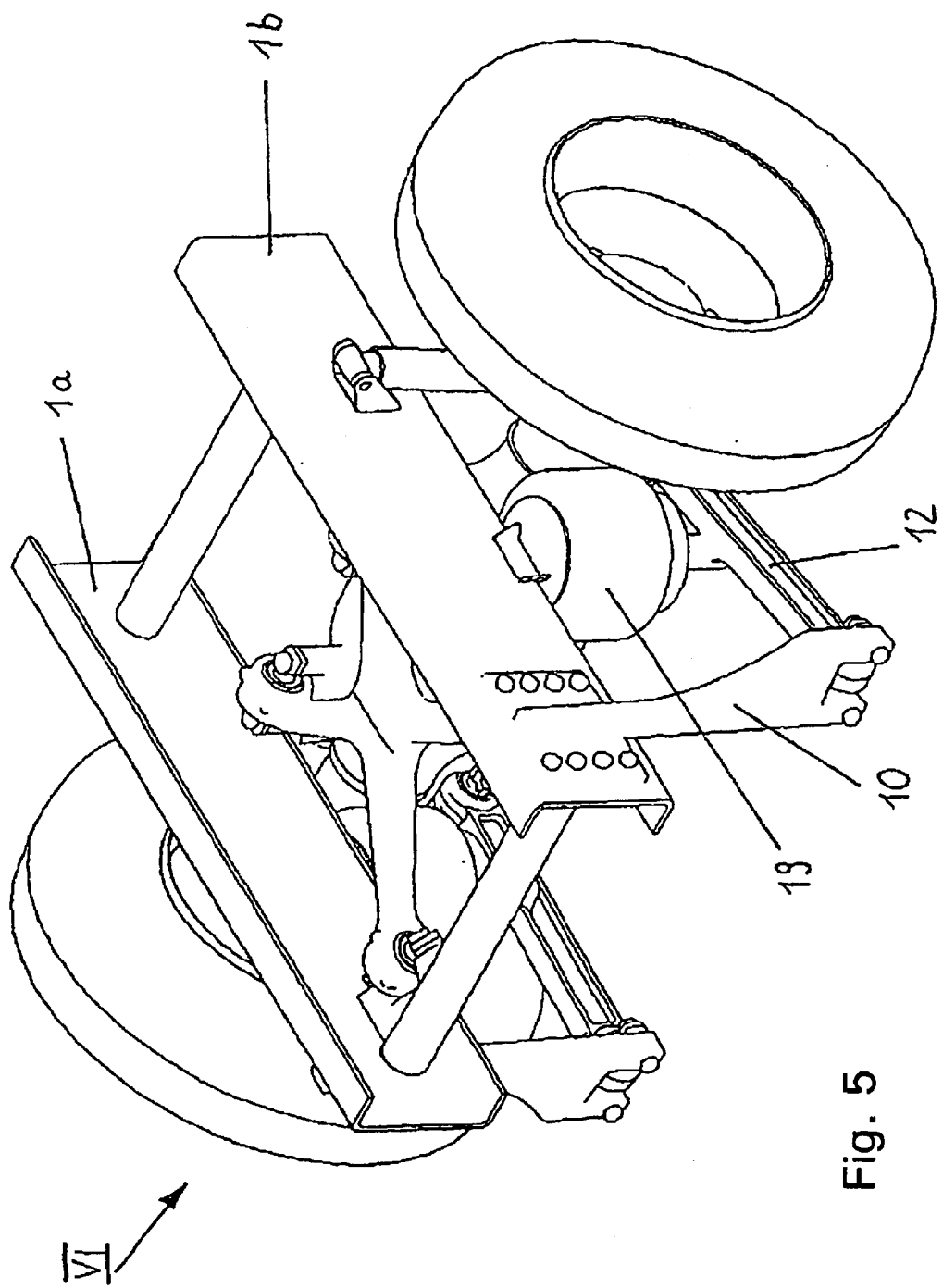
FIG. 5 is a perspective view of another exemplary embodiment of the axle suspension according to the present invention when viewed obliquely in the front in the direction of the vehicle.
Figure 6:
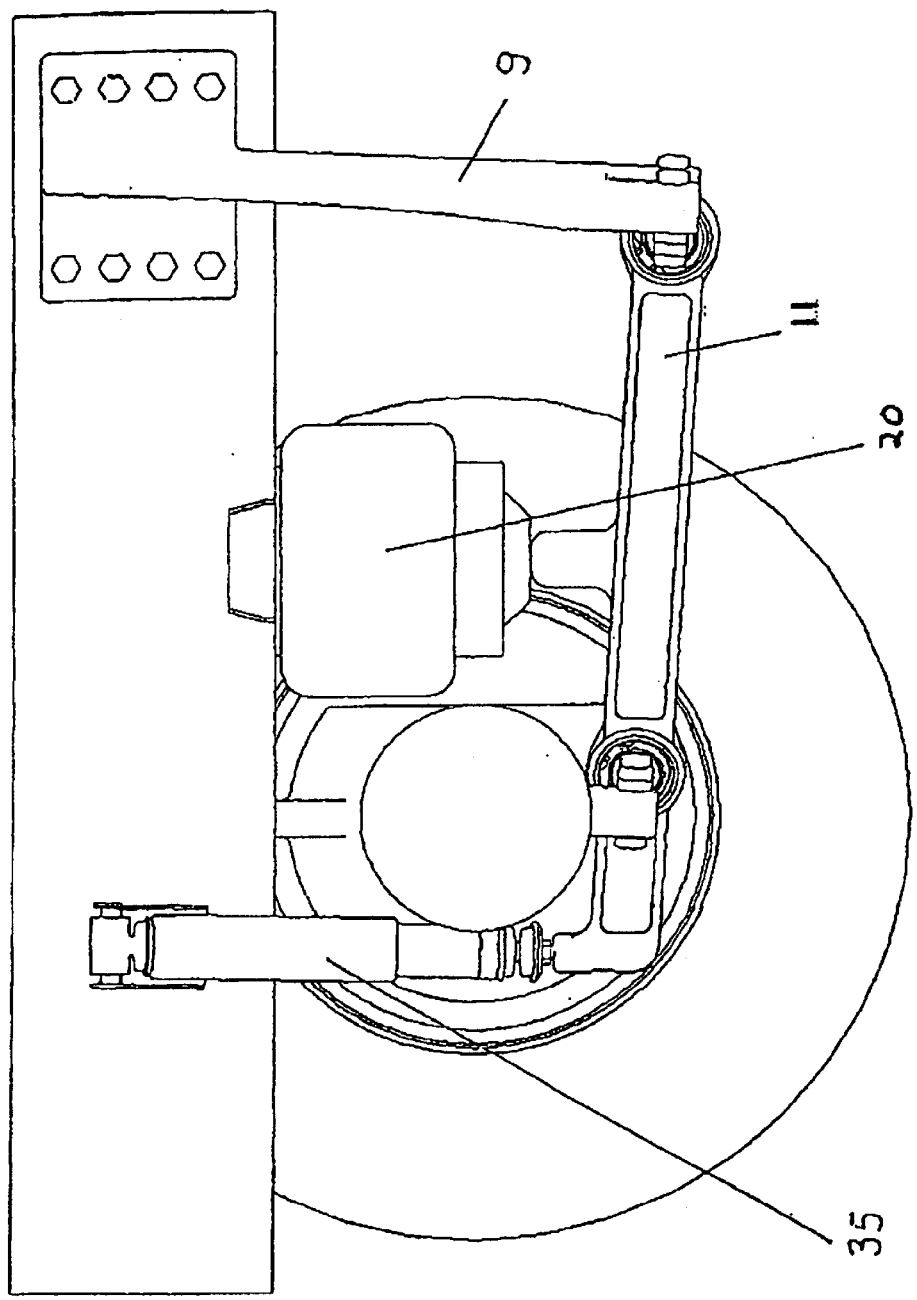
FIG. 6 is a view corresponding to the direction of arrow VI in FIG. 5, but without the wheel of the vehicle.

An embodiment with spring assembly units 19 (20) arranged in front of the vehicle axle 3 is shown in FIG. 5. The shock absorber 35 (36) is fastened to the mount 18 (17) in this embodiment and the spring assembly unit 19 (20) with an air bellows (air-suspension or air spring) is mounted on the axle strut 12 (11).

Figure 7:
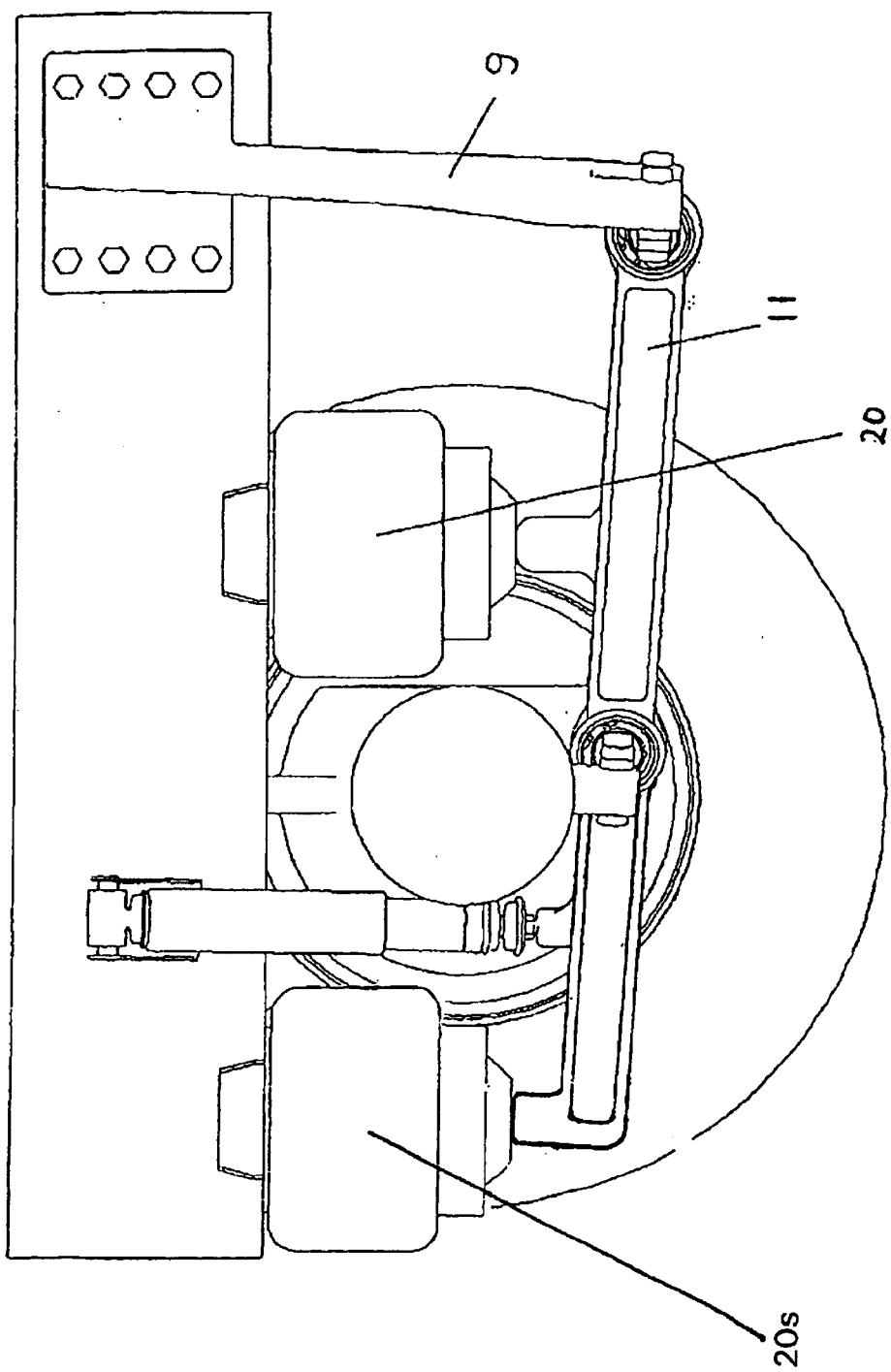
FIG. 7 is a view similar to that of FIG. 6, but with spring assemblies both in front of and behind the vehicle axle.

FIG. 7. Shows an embodiment with spring assemblies 20 (20a) both in front of and behind the vehicle axle.

While specific embodiments of the invention have been shown and described in detail to illustrate the application of the principles of the invention, it will be understood that the invention may be embodied otherwise without departing from such principles.

What is claimed is:

1. An axle suspension for a rigid vehicle axle, the axle suspension comprising:

a four-point connecting rod arranged above the vehicle axle;

two vehicle axle joints connecting two points of said four-point connecting rod to said vehicle axle in an articulated manner;

two vehicle body joints connecting two points of said four-point connecting rod to a vehicle body in an articulated manner, said two vehicle axle joints being located at spaced locations from one another in transverse direction of the vehicle and said two vehicle body joints being located at spaced locations from one another in a transverse direction of the vehicle;

an first axle strut extending in a longitudinal direction of the vehicle arranged on a first side of the vehicle for guiding the axle, said first axle strut connecting said vehicle axle to said vehicle body in a vertically movable manner;

an second axle strut extending in a longitudinal direction of the vehicle arranged on a second side of the vehicle for guiding the axle, said second axle strut connecting said vehicle axle to said vehicle body in a vertically movable manner;

a first spring assembly unit arranged between the vehicle axle and the vehicle body for spring suspension;

a second spring assembly unit arranged between the vehicle axle and the vehicle body for spring suspension;

a first molecular joint connecting said first axle strut to said vehicle axle at an articulation point, said first axle strut having a free end extending beyond said articulation point, said first spring assembly being positioned at said first axle strut free end;

a second molecular joint connecting said second axle strut to said vehicle axle at an articulation point, said second axle strut having a free end extending beyond said articulation point, said second spring assembly being positioned at said second axle strut free end.

2. An axle suspension in accordance with claim 1, wherein said first axle strut free end has a first mount for said spring assembly unit and said second axle strut free end has a second mount for said second spring assembly unit.

3. An axle suspension in accordance with claim 2, wherein said first mount includes a joint and said second mount includes a joint.

4. An axle suspension in accordance with claim 3, wherein the joints are ball-and-socket joints.

5. An axle suspension in accordance with claim 1, further comprising a first shock absober connected between said first axle strut and the vehicle body and a second shock absorber connected between said second axle strut and the vehicle body, said first axle strut having a first mount for said first shock absorber and said second axle strut having a second mount for said second shock absorber.

6. An axle suspension in accordance with claim 1, further comprising:

a third molecular joint connecting said first axle strut to said vehicle body; and a forth molecular joint connecting said second axle strut to said vehicle body.

7. An axle suspension in accordance with claim 6, wherein said third molecular joint connecting said first axle strut to said vehicle body has a stiffer joint characteristic than said first molecular joint connecting said first axle strut to said vehicle axle and said forth molecular joint connecting said second axle strut to said vehicle body has a stiffer joint characteristic than said second molecular joint connecting said second axle strut to said vehicle axle.

8. An axle suspension in accordance with claim 5, wherein said spring assembly unit is arranged in front of said vehicle axle and another spring assembly unit is arranged behind said vehicle axle.

9. An axle suspension in accordance with claim 1, wherein said spring assembly unit is arranged in front of said vehicle axle and another spring assembly unit is arranged behind said vehicle axle.

10. An axle suspension in accordance with claim 5, wherein said first mount includes a joint and said second mount includes a joint.

11. An axle suspension for a rigid vehicle axle of air-suspension utility vehicles, the axle suspension comprising:

a four-point twistable connecting member arranged above the vehicle axle;

two vehicle axle joints connecting two points of said four-point connecting member to said vehicle axle in an articulated manner;

two vehicle body joints connecting two points of said four-point connecting member to a vehicle body in an articulated manner, said two vehicle axle joints being located at spaced locations from one another in a transverse direction of the vehicle and said two vehicle body joints being located at spaced locations from one another in a transverse direction of the vehicle;

an first axle strut extending in a longitudinal direction of the vehicle arranged on a first side of the vehicle with a direct first strut to axle connection point for guiding the axle, said first axle strut including a first strut to vehicle chassis connection point connecting said vehicle axle to said vehicle body in a vertically movable manner;

an second axle strut extending in a longitudinal direction of the vehicle arranged on a second side of the vehicle with a direct second strut to axle connection point for guiding the axle, said second axle strut including a second strut to vehicle chassis connection point connecting said vehicle axle to said vehicle body in a vertically movable manner;

a spring assembly unit arranged between the vehicle axle and the vehicle body for spring suspension, said first axle strut having a first mount for said spring assembly unit;

another spring assembly unit arranged between the vehicle axle and the vehicle body for spring suspension, said second axle strut having second mount for said another spring assembly unit;

a further spring assembly unit arranged between the vehicle axle and the vehicle body for spring suspension;

a first molecular joint providing said first strut to axle connection point, connecting said first axle strut to said vehicle axle; and a second molecular joint providing said second strut to axle connection point, connecting said second axle strut to said vehicle axle.

12. An axle suspension in accordance with claim 11, wherein said first mount includes a joint and said second mount includes a joint.

13. An axle suspension in accordance with claim 12, wherein the joints are ball-and-socket joints.

14. An axle suspension in accordance with claim 11, further comprising a first shock absorber connected between said first axle strut and the vehicle body and a second shock absorber connected between said second axle strut and the vehicle body, said first axle strut having a first mount for said first shock absorber and said second axle strut having a second mount for said second shock absorber.

15. An axle suspension in accordance with claim 14, wherein said first mount includes a ball-and-socket joint and said second mount includes a ball-and-socket joint.

16. An axle suspension in accordance with claim 11, further comprising:

a third molecular joint connecting said first axle strut to said vehicle body; and a forth molecular joint connecting said second axle strut to said vehicle body.

17. An axle suspension in accordance with claim 16, wherein said third molecular joint connecting said first axle strut to said vehicle body has a stiffer joint characteristic than said first molecular joint connecting said first axle strut to said vehicle axle and said forth molecular joint connecting said second axle strut to said vehicle body has a stiffer joint characteristic than said second molecular joint connecting said second axle strut to said vehicle axle.

18. An axle suspension in accordance with claim 11, wherein said spring assembly unit is arranged in front of said vehicle axle and said another spring assembly is arranged behind the said vehicle axle.

19. An axle suspension in accordance with claim 14, wherein said spring assembly unit is arranged in front of said vehicle axle and said another spring assembly is arranged behind the said vehicle axle.

20. An axle suspension for a rigid vehicle axle, the axle suspension comprising:

a four-point connecting rod arranged above the vehicle axle;

two vehicle axle joints connecting two points of said four-point connecting rod to said vehicle axle in an articulated manner;

two vehicle body joints connecting two points of said four-point connecting rod to a vehicle body in an articulated manner, said two vehicle axle joints being located at spaced locations from one another in a transverse direction of the vehicle and said two vehicle body joints being located at spaced locations from one another in a transverse direction of the vehicle;

an first axle strut extending in a longitudinal direction of the vehicle arranged on a first side of the vehicle for guiding the axle, said first axle strut connecting said vehicle axle to said vehicle body via a joint at a first front articulation point for movement of said first axle strut relative to said vehicle body vertically;

an second axle strut extending in a longitudinal direction of the vehicle arranged on a second side of the vehicle for guiding the axle, said second axle strut connecting said vehicle axle to said vehicle body via a joint at a second front articulation point for movement of said second axle strut relative to said vehicle body vertically;

a spring assembly unit arranged between the vehicle axle and the vehicle body for spring suspension;

a fist molecular joint connecting said first axle strut to said vehicle axle at an articulation point, said first axle strut having a direction toward a middle of the vehicle in an extent of said first axle strut from said front articulation point toward a rear of the vehicle; and a second molecular joint connecting said second axle strut to said vehicle axle at an articulation point, said second axle strut having a direction toward a middle of the vehicle in an extent of said second axle strut from said front articulation point toward a rear of the vehicle.

21. An axle suspension for a rigid vehicle axle of air-suspension utility vehicles, the axle suspension comprising:

a four-point twistable connecting member arranged above the vehicle axle;

two vehicle axle joints connecting two points of said four-point connecting member to said vehicle axle in an articulated manner;

two vehicle body joints connecting two points of said four-point connecting member to a vehicle chassis in an articulated manner, said two vehicle axle joints being located at spaced locations from one another in a transverse direction of the vehicle and said two vehicle body joints being located at spaced locations from one another in a transverse direction of the vehicle;

an first axle strut extending in a longitudinal direction of the vehicle arranged on a first side of the vehicle with a direct first strut to axle connection point for guiding the axle, said first axle strut including a first strut to vehicle chassis connection point connecting said vehicle axle to said vehicle chassis in a vertically movable manner;

an second axle strut extending in a longitudinal direction of the vehicle arranged on a second side of the vehicle with a direct second strut to axle connection point for guiding the axle, said second axle strut including a second strut to vehicle chassis connection point connecting said vehicle axle to said vehicle chassis in a vertically movable manner;

a spring assembly unit arranged between the first axle strut and the vehicle body and behind the axle, with respect to a direction of travel of the vehicle, for spring suspension;

another spring assembly unit arranged between the second axle strut and the vehicle body and behind the axle, with respect to a direction of travel of the vehicle, for spring suspension;

a first molecular joint providing said first strut to axle connection point, connecting said first axle strut to said vehicle axle; and a second molecular joint providing said second strut to axle connection point, connecting said second axle strut to said vehicle axle.

22. An axle suspension for a rigid vehicle axle of air suspension utility vehicles, the axle suspension comprising:

a four-point twistable connecting member arranged above the vehicle axle;

two vehicle axle joints connecting two points of said four-point connecting member to said vehicle axle in an articulated manner;

two vehicle body joints connecting two points of said four-point connecting member to a vehicle body in an articulated manner, said two vehicle axle joints being located at spaced locations from one another in a transverse direction of the vehicle and said two vehicle body joints being located at spaced locations from one another in a transverse direction of the vehicle;

an first axle strut extending in a longitudinal direction of the vehicle arranged on a first side of the vehicle for guiding the axle, said first axle strut connecting said vehicle axle to said vehicle body in a vertically movable manner;

an second axle strut extending in a longitudinal direction of the vehicle arranged on a second side of the vehicle for guiding the axle, said second axle strut connecting said vehicle axle to said vehicle body in a vertically movable manner;

a forward spring assembly unit arranged between the first axle strut and the vehicle body and in front of the axle, with respect to a direction of travel of the vehicle, for spring suspension;

another forward spring assembly unit arranged between the first axle strut and the vehicle body and behind the axle, with respect to a direction of travel of the vehicle, for spring suspension;

a rear spring assembly unit arranged between the second axle strut and the vehicle body and rearwardly of the axle, with respect to a direction of travel of the vehicle, for spring suspension;

another rear spring assembly unit arranged between the vehicle axle and the vehicle body and rearwardly of the axle, with respect to a direction of travel of the vehicle, for spring suspension;

a first molecular joint connecting said first axle strut to said vehicle axle; and a second molecular joint connecting said second axle strut to said vehicle axle.

23. An axle suspension for a rigid vehicle axle of air-suspension utility vehicles, the axle suspension comprising:
- a four-point twistable connecting member arranged above the vehicle axle;
- two vehicle axle joints connecting two point of said four-point connecting member to said vehicle axle in an articulated manner;
- two vehicle body joints connecting two points of said four-point connecting member to a vehicle body in an articulated manner, said two vehicle axle joints being located at spaced locations from one another in a transverse direction of the vehicle and said two vehicle body joints being located at spaced locations from one another in a transverse direction of the vehicle;
- an first axle strut extending in a longitudinal direction of the vehicle arranged on a first side of the vehicle for guiding the axle, said first axle strut connecting said vehicle axle to said vehicle body in a vertically movable manner;
- an second axle strut extending in a longitudinal direction of the vehicle arranged on a second side of the vehicle for guiding the axle, said second axle strut connecting said vehicle axle to said vehicle body in a vertically movable manner;
- a spring assembly unit arranged between the first axle strut and the vehicle body for spring suspension, said first axle strut having a first mount for said spring assembly unit;
- another spring assembly unit arranged between the second axle strut and the vehicle body for spring suspension, said second axle strut having a second mount for said another spring assembly unit;
- a first shock absorber connected between said first axle strut and said vehicle body, said first axle strut having a first shock absorber mount for said first shock absorber, said first mount for said spring assembly unit being spaced from said first shock absorber mount along said first axle strut;
- a second shock absorber connected between said second axle strut and the vehicle body, said second axle strut having a second shock absorber mount for said second shock absorber, said second mount for said spring assembly unit being spaced from said second shock absorber mount along said second axle strut;
- a first molecular joint connecting said first axle strut to said vehicle axle; and
- a second molecular joint connecting said second axle strut to said vehicle axle.

24. An axle suspension for a rigid vehicle axle, the axle suspension comprising:
- a four-point connecting rod arranged above the vehicle axle;
- two vehicle axle joints connecting two points of said four-point connecting rod to said vehicle axle in an articulated manner;
- two vehicle body joints connecting two points of said four-point connecting rod to a vehicle body in an articulated manner, said two vehicle axle joints being located at spaced locations from one another in a transverse direction of the vehicle and said two vehicle body joints being located at spaced locations from one another in a transverse direction of the vehicle;
- an first axle strut extending in a longitudinal direction of the vehicle arranged on a first side of the vehicle for guiding the axle, said first axle strut connecting said vehicle axle to said vehicle body in a vertically movable manner;
- an second axle strut extending in a longitudinal direction of the vehicle arranged on a second side of the vehicle for guiding the axle, said second axle strut connecting said vehicle axle to said vehicle body in a vertically movable manner;
- a spring assembly unit arranged between the vehicle axle and the vehicle body for spring suspension;
- a first molecular joint connecting said first axle strut to said vehicle axle;
- a second molecular joint connecting said second axle strut to said vehicle axle;
- a third molecular joint connecting said first axle strut to said vehicle body; and
- a forth molecular joint connecting said second axle strut to said vehicle body, wherein said third molecular joint connecting said first axle strut to said vehicle body has a stiffer joint characteristic than said first molecular joint connecting said first axle strut to said vehicle axle and said forth molecular joint connecting said second axle strut to said vehicle body has a stiffer joint characteristic than said second molecular joint connecting said second axle strut to said vehicle axle.

* * * * *